(12) United States Patent
Baur et al.

(10) Patent No.: US 7,676,311 B2
(45) Date of Patent: Mar. 9, 2010

(54) METHOD FOR CONTROLLING A SAFETY DEVICE IN A MOTOR VEHICLE

(75) Inventors: Richard Baur, Pfaffenhofen (DE); Patrick Hellwig, Munich (DE); Marko Beszeni, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 403 days.

(21) Appl. No.: 11/703,237

(22) Filed: Feb. 7, 2007

(65) Prior Publication Data
US 2007/0182140 A1    Aug. 9, 2007

(30) Foreign Application Priority Data
Feb. 8, 2006    (DE) .................. 10 2006 005 719

(51) Int. Cl.
*B60R 22/00*    (2006.01)
(52) U.S. Cl. ....................................... 701/45
(58) Field of Classification Search .............. 701/45, 701/36; 180/271, 286
See application file for complete search history.

(56) References Cited

U.S. PATENT DOCUMENTS

| | | | |
|---|---|---|---|
| 5,531,472 A | 7/1996 | Semchena et al. | |
| 6,170,866 B1 | 1/2001 | Popp et al. | |
| 6,254,126 B1 | 7/2001 | Bauer et al. | |
| 6,255,790 B1 | 7/2001 | Popp et al. | |
| 2007/0067083 A1* | 3/2007 | Shen et al. ................ | 701/49 |
| 2007/0296193 A1* | 12/2007 | Bacher et al. .............. | 280/748 |

FOREIGN PATENT DOCUMENTS

| | | |
|---|---|---|
| DE | 38 02 159 A1 | 8/1989 |
| DE | 44 17 064 A1 | 7/1995 |
| DE | 196 17 405 A1 | 11/1996 |
| DE | 196 48 268 A1 | 5/1998 |
| DE | 196 48 267 C1 | 6/1998 |
| DE | 197 34 508 A1 | 2/1999 |
| DE | 198 52 541 C1 | 3/2000 |
| DE | 101 63 880 A1 | 7/2003 |
| DE | 103 35 734 A1 | 2/2005 |
| DE | 10 2004 047 907 A1 | 4/2006 |
| FR | 2 761 032 A1 | 9/1998 |

OTHER PUBLICATIONS

German Search Report dated Aug. 16, 2006 w/English translation of pertinent portion (Nine (9) pages).

* cited by examiner

*Primary Examiner*—Kim T Nguyen
(74) *Attorney, Agent, or Firm*—Crowell & Moring LLP

(57) ABSTRACT

In a method for controlling a safety device in a motor vehicle, wherein the safety device is controlled as a function of at least one preset characteristic of a vehicle seat in the motor vehicle, an electric adjusting mechanism, which is provided for adjusting the preset characteristic of the vehicle seat, detects the measured adjustments, which relate to the preset characteristic, and that the preset characteristic is determined with the aid of the measured adjustments.

9 Claims, 1 Drawing Sheet

METHOD FOR CONTROLLING A SAFETY DEVICE IN A MOTOR VEHICLE

CROSS REFERENCE TO RELATED APPLICATIONS

This application claims priority under 35 U.S.C. §119 to German Patent Application No. 10 2006 005 719.8 filed Feb. 8, 2006, the entire disclosure of which is herein expressly incorporated by reference.

BACKGROUND AND SUMMARY OF THE INVENTION

The present invention relates to a method for controlling a safety device in a motor vehicle, wherein the safety device is controlled as a function of at least one preset characteristic of a vehicle seat in the motor vehicle.

In order to guarantee an optimal protective effect and/or to avoid endangering the vehicle occupants, it is known to design the control of the safety devices in motor vehicles, for example, the firing of an airbag, as a function of the position of the seat of a vehicle occupant sitting on the vehicle seat.

Furthermore, it is known from the prior art, such as French patent document FR 2761032, to derive the seat position of a vehicle occupant sitting on the vehicle seat from the preset characteristics of the vehicle seat. Therefore, a safety device is controlled as a function of the preset characteristics. For example, the setting position of the vehicle seat in the longitudinal direction of the vehicle constitutes a preset characteristic in this context. Even the tilt of the seat backrest, the adjusted height of the seat, the height of the head support and other settings may constitute the preset characteristics of the vehicle seat in this context.

For example, if one assumes that the vehicle occupant is sitting upright and leaning back, one can derive approximately the sitting position of the vehicle occupant from the preset characteristics of the vehicle seat. In addition to the sitting position of a vehicle occupant sitting on the vehicle seat, such preset characteristics of a vehicle seat can be used to derive other parameters of a vehicle occupant, which can be considered in controlling the safety devices. For example, a vehicle seat that is adjusted far down and/or back opposite the longitudinal direction of the vehicle may indicate that the respective vehicle occupant is very tall; tightly pushed together seat cheeks may indicate a low body weight of the vehicle occupant.

A stepwise control of the actuators of an airbag or the control of a belt force limiter may be carried out, as known from the prior art, as a function of the vehicle occupant's seat position (or other parameters), which are derived from the preset characteristics of the vehicle seat. A stepwise airbag control may serve to avoid injuries caused by firing the airbag with its full capacity when the distance between the airbag module and the upper torso of the vehicle occupant is short.

One key process step in such methods often consists of assigning one of several defined occupant classes to a vehicle occupant on the basis of the seat position (or other parameters) derived from the preset characteristics of the vehicle seat. Known characteristics of such classes are the so-called "5th percentile adult female" and the so-called "50th percentile adult male."

In order to determine the preset characteristics of the vehicle seat it is known to measure the respective preset characteristic with one or more sensors. Thus, for example, Hall switches or optical sensors are often used. In current systems such sensors are often mounted along a longitudinal adjustment rail of a vehicle seat. However, the sensors are often very expensive, depending on the model. Mounting such sensors often involves a very complicated installation process. For example, the sensors usually require their own supply lines. The sensors and optionally their supply lines are often exposed to high mechanical stresses and are, therefore, susceptible to damage and/or destruction. In addition, the information processing unit (usually an airbag controller), which is assigned to such a sensor, requires a separate signal input for picking up the sensor signals and a certain calculating power for processing the same. Furthermore, the reliability of such sensors is inadequate due to the underlying concept alone. For example, contactless sensors are susceptible to coverings.

An object of the present invention is to provide a simple method for controlling a safety device in a motor vehicle, with which a preset characteristic can be determined with little complexity.

The invention is based on the idea that in many vehicle seats at least one preset characteristic, for example, the longitudinal seat position, can be adjusted by an electric adjusting mechanism. Such an electric adjusting mechanism may be constructed with little technical complexity in such a manner that the measured adjustments, which relate to the adjustment and, thus, to the change in the preset characteristic, may be detected by the mechanism. Then the preset characteristic itself may be determined with such measured adjustment values.

A measured adjustment value in the context of the invention may be first of all, any measured quantity, which is obtained with the electric adjusting mechanism and relates to the preset characteristic, for example, allows conclusions to be drawn about it. In the simplest case, it may be the measured quantity of a sensor, which is assigned to the electric adjusting mechanism and measures directly the preset characteristic.

A measured adjustment value in the context of the invention may also be any measured quantity that relates to an adjustment, i.e., a change, in the preset characteristic by the electric adjusting mechanism. It may be, for example, the output signal of a sensor, which monitors the movement of an actuator of the electric adjusting mechanism. Also, the current consumption of an actuator of the electric adjusting mechanism, for example, may be evaluated.

If the correlation between the activity of the electric adjusting mechanism and the resulting movement of the vehicle seat, in particular the resulting change in the preset characteristic of interest, is known, then the preset characteristic itself may be derived from it. An additional condition is that under some circumstances the preset characteristic must be known at least approximately prior to the activity of the adjusting mechanism. However, this condition may be fulfilled if the measured adjustment values are detected and processed with high accuracy and/or if the calibration method is appropriate.

Then the preset characteristic, which relates to the vehicle seat and is determined by the method of the invention, may be used to control the safety device, for example an airbag, of the motor vehicle. According to the invention, the electric adjusting mechanism of the vehicle seat is connected to a controller for controlling the safety device by communications hardware. The corresponding information is transferred from the electric adjusting mechanism to the controller for controlling the safety device.

In so doing, the preset characteristic may already be determined by the electric adjusting mechanism with the aid of the measured adjustment values and may be transferred as the finished result to the controller for controlling the safety device. However, the measured adjustment values themselves may also be transferred to the controller for controlling the safety device, for example, an airbag controller. Even the determination and transfer of an intermediate result is conceivable. Similarly, the preset characteristic may already be further evaluated in the electric adjusting mechanism, and the result of this evaluation may be transferred. Therefore, the electric adjusting mechanism may already have categorized the vehicle occupant sitting on the vehicle seat by the preset characteristic.

A significant difference between the method of the invention and this class of method according to the prior art lies in the fact that the prior art sensors for picking up a preset characteristic of the vehicle seat are designed independently of the electric adjusting mechanism. They are usually assigned to the respective safety device and are connected to the safety device by communications hardware. The prior art methods have high costs, high integration complexity, high susceptibility and low reliability. In the invention, however, the measured adjustment values are obtained directly by the electric adjusting mechanism and/or a component of the same. In addition, the electric adjusting mechanism may exhibit at least one suitable sensor, which is assigned directly to the adjusting mechanism. Such a sensor may be integrated by hardware into the adjusting mechanism and/or a part of the same. However, such a sensor may also be designed separately from the other components of the electric adjusting mechanism and may be connected to the electric adjusting mechanism only by communications hardware. According to an exemplary embodiment of the invention, a sensor is connected directly to an actuator of the adjusting mechanism. The activity of the actuator may be monitored easily and reliably in this way.

Thus, the present invention provides a simple, inexpensive and reliable method for determining a preset characteristic of a vehicle seat, as a function of which a safety device in a motor vehicle may be controlled.

The data, obtained according to the invention, may relate to the configuration and/or preset values of the vehicle seat. The data correspond to the data of a seat memory function or can be converted into such a function. Correspondingly, the data obtained according to the invention may additionally be used for a seat memory function.

A single preset characteristic or a plurality of preset characteristics of the vehicle seat may be determined by the invention. The preset characteristic(s) in the context of the invention may be the setting position of the vehicle seat in the longitudinal direction of the vehicle. The setting position of the vehicle seat in the longitudinal direction of the vehicle makes an especially conclusive statement about the spatial position of the upper torso of the respective vehicle occupant. This spatial position in turn is crucial for an optimal control of many safety devices.

The determination of the preset characteristic according to the present invention may be carried out on the basis of the relative measurement. That is, the preset characteristic is determined by measuring and/or estimating the change in the preset characteristic with respect to a previously known setting position.

For example, electrical drive motors are used in many electric adjusting mechanisms for vehicle seats. The movement of the vehicle seat and, therefore, also the change in a preset characteristic of the vehicle seat, are usually in direct correlation with the activity of the drive motor. Thus, the number of revolutions of a drive motor or a component of a gear, connected between the drive motor and the vehicle seat, may indicate the resulting change in the preset characteristic.

Revolutions of drive motors may be recorded very easily with so-called pulse generators. Correspondingly, a pulse generator, which is connected to a drive motor or the gear of a drive motor of the adjusting mechanism, may be used for recording the measured adjustment values. Depending on the design, such a pulse generator may detect fractions of a revolution or whole revolutions of the drive motor at a very high angular resolution. A very inexpensive variant that is easy to evaluate is the so-called Hall counter, which usually delivers only a single pulse per revolution. Yet in many applications, satisfactory accuracy may be obtained initially even with Hall counters.

Every conceivable method of measurement for determining the preset characteristic has a limited accuracy. In particular, a determination of the preset characteristic on the basis of a relative measurement may lead to a drift in the preset characteristic that is determined in this manner. At the same time slight inaccuracies of the underlying measurement method accumulate. The inaccuracy that results from the measurement method or for other reasons with respect to determining the preset characteristic is reduced and/or eliminated by calibration, according to an exemplary embodiment of the invention.

In order to calibrate, a state may be induced in which the absolute value of the preset characteristic is known. For example, an actuator may be operated until a mechanical stop is reached. Then the relative measurement may be continued based on the known absolute value of the preset characteristic. In everyday practice, it is often customary for calibration purposes to move the vehicle seat to the front until it reaches the stop of its longitudinal guide rail.

Provided that the calibration can be carried out without the interaction of a vehicle occupant or a service expert or without having a negative impact on the vehicle occupants or on the normal travel motion, the calibration may be carried out automatically and may be, for example, triggered by the electric adjusting mechanism itself. The calibration may be carried out as a function of a gauge for an inaccuracy in determining the preset characteristic.

According to a further embodiment of the invention, the gauge for an inaccuracy in determining the preset characteristic may be defined and determined in such a way that the number of adjustment events of the electric adjusting mechanism since the last calibration serves as the gauge for the inaccuracy. An aspect of this further embodiment of the invention is that in many of the possible measurement principles for determining the measured adjustments, especially with the use of pulse generators, a certain, principle-dependent measurement error (e.g., quantization error) occurs at the start and/or stop of any adjustment event independently of its scale. Therefore, crucial for the resulting cumulative error is surprisingly not the scale since the last calibration and not the total duration of use since the last calibration, but rather the number of adjustment events since the last calibration.

The number of adjustment events since the last calibration may be recorded in a very simple way with an electronic counter. This counter may be assigned to the electric adjusting mechanism. As an alternative, the electric adjusting mechanism may report each adjustment event to an external counter. The counter may be reset for each calibration.

According to another exemplary embodiment of the invention, the calibration may be brought about with the cooperation of a vehicle occupant. For example, it may be necessary for the vehicle occupant to actuate the electric adjusting mechanism for calibration purposes in such a manner that a mechanical stop is reached. Such a calibration state may be induced consciously, but also inadvertently, especially without any calibration intention, by the vehicle occupant. Usually such a calibration, which is carried out accidentally and/or unintentionally by a vehicle occupant, is prevented by suitable measures. For example, a so-called soft block, i.e., a virtual stop, may be provided. Therefore, the vehicle seat cannot be moved beyond a defined measured or estimated position in order not to reach an actual mechanical stop.

If, however, a calibration is desired, such a measure for preventing the vehicle occupant from being able to carry out a calibration can also be specifically deactivated. The calibration may be desired if the determination of the preset characteristic has an intrinsically high inaccuracy or rather uncertainty. Correspondingly, a measure for preventing a vehicle occupant from being able to carry out a calibration may be deactivated as a function of a gauge for an inaccuracy in determining the preset characteristic.

In this exemplary embodiment of the invention, the number of adjustment events of the electric adjusting mechanism since the last calibration may serve as the gauge for the inaccuracy of the preset characteristic.

It may be advantageous to make the actual calibration of the electric adjusting mechanism (usually setting the current value of the relative measurement to a known absolute value) subject to the additional conditions, in order to avoid miscalibrations. For example, a miscalibration could be generated by a coin sliding into a seat rail. The coin may be inadvertently detected by the electric adjusting mechanism as a mechanical stop. A suitable additional condition is a positive result of a plausibility test. Such a plausibility test may be conducted as follows. A tolerance range, within which a mechanical stop (or another calibration triggering point) is expected, is determined from the number of adjustment events of the electric adjusting mechanism (or another gauge for the inaccuracy).

If at this stage the electric adjusting mechanism detects that a mechanical stop has been reached (or detects another calibration triggering event), it is checked whether the current seat setting, which is determined by the relative measurement, is in the tolerance range. Only if this plausibility test leads to a positive result is a calibration carried out. This exemplary embodiment of the invention considers the idea that even if the measurement is flawed, the preset characteristic is always known at least approximately. Especially when it is possible for the respective vehicle occupant to conduct an inadvertent and/or unintentional calibration, it may be advantageous to make the actual calibration subject to such a plausibility condition.

It may also be advantageous to send a request for calibration as a function of a gauge for an inaccuracy in determining the preset characteristic. This output to the driver of the motor vehicle may ensue, for example, by an optical or acoustical unit. However, an entry into an error storage of the motor vehicle may also be made, or a service provider may be informed by a wireless communications link.

If no calibration has occurred over a prolonged period of time or after a large number of adjustment events, the result may very well be a high inaccuracy or rather uncertainty in determining the preset characteristic. The safety device may be controlled as a function of the preset characteristic. If, however, it is known only inadequately, it may be advantageous to adapt the control at least in such a way that specific variants of the control that may have an especially negative impact in the event of a faulty value of the preset characteristic are ruled out.

For example, a method that makes a fundamental distinction between a "5th percentile adult female" and a "50th percentile adult male" can be further developed in such a way that if there is a considerable amount of inaccuracy or rather uncertainty about the preset characteristic, the assumption is always a "50th percentile adult male." Thus, the risk of an especially poor combination of the actual vehicle occupant and a hypothesis about the vehicle occupant is eliminated. Even in this exemplary embodiment of the invention the number of adjustment events of the electric adjusting mechanism since the last calibration may serve as the gauge for the inaccuracy of the preset characteristic.

The aforementioned measures to be taken as a function of a gauge for an inaccuracy in determining the preset characteristic may be implemented individually or in any combination. As the inaccuracy increases, the measures may be implemented gradually in an especially advantageous manner, for example, in gradation. Therefore, if, for example, the number of adjustment events of the electric adjusting mechanism since the last calibration exceeds a first threshold, a random calibration may be allowed. When a second threshold is exceeded, the driver is requested to initiate a calibration. When a third threshold is exceeded, an error is entered, and the control of the safety device is changed over to a more reliable mode that is independent of the preset characteristic.

Other objects, advantages and novel features of the present invention will become apparent from the following detailed description of the invention when considered in conjunction with the accompanying drawings.

DETAILED DESCRIPTION OF THE DRAWINGS

Figure 1:
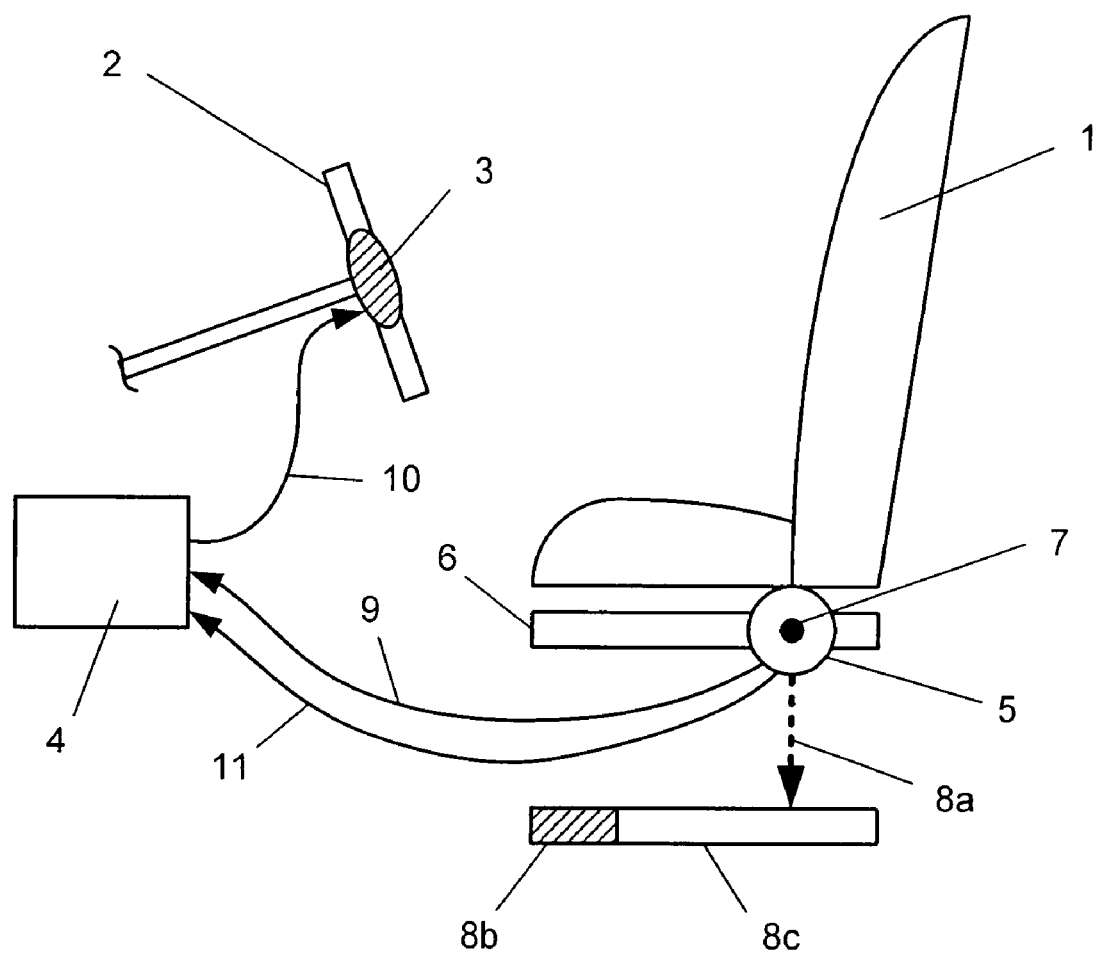
FIG. 1 depicts a device for applying an exemplary embodiment of the inventive method and parts of the signal flow upon use of the method.

FIG. 1 depicts a motor vehicle seat 1 with an electric adjusting mechanism 5 in a motor vehicle. The motor vehicle seat 1 can be moved along the rail 6 in the longitudinal direction of the vehicle by the electric adjusting mechanism 5.

Furthermore, FIG. 1 depicts an airbag 3, which is disposed in the steering wheel 2 of the same motor vehicle. The airbag 3 may be controlled in a number of different ways by the signal 10 from the control unit 4. The control of the airbag 3 by the control unit 4 is carried out as a function of the longitudinal position of the seat as the preset characteristic of the motor vehicle seat 1. The procedure is based on the consideration that the longitudinal position of the seat allows conclusions to be drawn about the vehicle occupant sitting on the motor vehicle seat 1.

Therefore, the first step is to distinguish between a "5th percentile adult female" and a "50th percentile adult male" with the aid of the longitudinal position of the motor vehicle seat 1. In the case of a "5th percentile adult female" the airbag 3 is actuated step-by-step. In addition, a corresponding belt force level of a restraining belt, which is not illustrated in FIG. 1, is added.

The classification between "5th percentile adult female" and "50th percentile adult male" is carried out by the electric adjusting mechanism 5 itself and/or a computing unit in the electric adjusting mechanism 5. The classification is carried out with the aid of a seat adjustment field 8b, 8c of the motor vehicle seat 1 in the longitudinal direction of the seat. The seat adjustment field 8b, 8c, depicted in FIG. 1, is not formed physically. It serves only to illustrate the range of adjustment for the motor vehicle seat 1 in FIG. 1. The current absolute position of the motor vehicle seat 1 inside the seat adjustment field 8b, 8c is illustrated in FIG. 1 by the arrow 8a, which is also not formed physically.

The electric adjusting mechanism 5 includes a sensor 7. The longitudinal seat setting 8a inside the seat adjustment field 8b, 8c is determined by the signals of the sensor 7 (the measured adjustments in the context of the invention), which are detected by the electric adjusting mechanism 5.

The electric adjusting mechanism 5 classifies the vehicle occupant on the basis of the longitudinal seat position 8a. If the longitudinal seat position 8a is in the front area 8b (shaded in FIG. 1) of the seat adjustment field, the vehicle occupant is classified as "5th percentile adult female"; the rear area 8c, as "50th percentile adult male." The electric adjusting mechanism 5 reports the class of vehicle occupant, determined by this method, to the control unit 4 by a signal 9.

The position of the limit between the front area 8b and the rear area 8c is stored in the electric adjusting mechanism 5 and can be coded inside the entire seat adjustment field.

Finding the longitudinal seat position 8a on the basis of the signals of the sensor 7 is subject to a certain amount of inaccuracy. The sensor 7 is constructed as a Hall counter and is coupled directly to an output shaft of a drive motor of the electric adjusting mechanism 5. Therefore, each revolution of the motor can send a pulse to a computing unit of the electric adjusting mechanism 5, which carries out the actual finding of the longitudinal seat position 8a. Therefore, in order to find the longitudinal seat position 8a, the number of motor revolutions, based on an earlier known longitudinal seat position, is counted. Thus, the longitudinal seat position 8a is found on the basis of a relative measurement. The pulses of the Hall counter 7 can be counted, for example, with a position counter of the electric adjusting mechanism 5.

Since the actual adjustment travel during an adjustment event is usually not equivalent precisely to one revolution of a motor, the result of the limited resolution of the sensor 7 is an inaccuracy in determining the longitudinal seat position 8a. Therefore, the final count of the position counter may indicate only with limited accuracy the actual longitudinal seat position 8a. This inaccuracy increases as the number of adjustment events increases.

The error (e.g., drift), resulting from this inaccuracy in determining the longitudinal seat position 8a, may be reset from time to time by a suitable method for calibration. To this end, the electric adjusting mechanism 5 includes an event counter, which counts the number of adjustment events. The following described measures are taken as a function of the final count of the event counter, which serves, according to the invention, as a gauge for the inaccuracy in determining the longitudinal seat position 8a.

In order to increase the probability of a random recalibration by the customer, a so-called soft block is deactivated when a decodable count (STEP_1) of the event counter is exceeded.

The soft block constitutes to some extent a virtual stop of the seat adjustment and usually prevents a seat adjustment beyond a defined longitudinal position of the seat. Thus, the soft block usually prevents the front mechanical stop of the rail 6 from being reached. Not until the soft block is deactivated can the vehicle occupant move the vehicle seat 1 as far as the stop of the rail 6 and, thus, trigger a recalibration. During recalibration the position counter is set, for example, to a count that corresponds to the absolute position in the mechanical stop.

The recalibration is rendered plausible with respect to the existing calibrating information so that another mechanical blockade of the seat adjustment (e.g., by a coin jammed in the rail 6) is not identified erroneously as the mechanical stop. To this end, the degree to which the longitudinal position of the seat that is detected on the basis of the signals of the Hall counter 7 deviates from the known absolute position of the mechanical stop is checked. The tolerance range, within which the deviation may lie, in order to yield a position result of the plausibility test, is filed in a decodable format in the electric adjusting mechanism 5.

If the plausibility test fails, the longitudinal position of the seat and/or the class of vehicle occupant is no longer transferred as a signal 9 to the control unit 4. Instead, a signal 11 "calibration necessary" is sent from the electric adjusting mechanism 5 to the control unit 4. Upon receipt of this signal the control unit 4 generates a warning, emitted visually in the cockpit of the vehicle, requesting the vehicle occupant to calibrate the seat according to the instructions in the motor vehicle manual.

If the seat is not calibrated beyond a still larger number (STEP_2) of adjustment events, the signal 11 "calibration necessary" is also emitted. The signal 11 may be transmitted separately from or together with the signal 9 as a single signal bit inside the signal 9.

The signal 11 is evaluated by the control unit 4, which generates a warning, which may be emitted visually in the cockpit of the vehicle and by which the vehicle occupant may be requested to calibrate the seat according to the instructions in the manual.

If the calibration request is ignored by the vehicle occupant (therefore, no recalibration takes place), then after another step (STEP_3) of the number of adjustment events the longitudinal position of the seat and/or the class of vehicle occupant is no longer transferred as a signal 9 to the control unit 4. This is supposed to guarantee that the inaccuracy of the position sensing due to the lack of a recalibration will not lead to the wrong class of vehicle occupant being transmitted to the control unit 4. Then the control unit 4 assumes the default state "50th percentile adult male." In addition, the entry of an error "calibration necessary" may be filed in the memory of the electric adjusting mechanism 5, so that at a later service date a service expert can recognize the need for a calibration.

In the present example, a vehicle occupant class is transferred as the signal 9 to the control unit 4. Similarly, in other embodiments of the invention that are not described in detail here, the actual longitudinal position of the seat may be transferred to the control unit 4 and evaluated in the control unit.

The present invention achieves the goal of considering the preset characteristics of a motor vehicle seat with very little complexity in order to control the safety devices. Therefore, a control of the safety devices that is adapted to the actual requirements may be realized, and the risk of injuring the vehicle occupants may be minimized.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for controlling a safety device in a motor vehicle, wherein the safety device is controlled as a function of a preset characteristic of a vehicle seat in the motor vehicle, comprising the acts of:
    adjusting the preset characteristic of the vehicle seat with an electric adjusting mechanism;
    detecting measured adjustments of the preset characteristic of the vehicle seat, including detecting measured adjustment values with a pulse generator which is connected to a drive motor or the gear of a drive motor of the adjusting mechanism;
    determining an adjusted preset characteristic of the vehicle seat based on a difference between a starting position of the preset characteristic of the vehicle seat and the measured adjustments of the preset characteristic of the vehicle seat; and controlling the safety device based upon the adjusted preset characteristic of the vehicle seat, wherein an inaccuracy in determining the adjusted preset characteristic is reduced or eliminated by a calibration, wherein the calibration is carried out as a function of a number of a plurality of adjustments of the preset characteristic of the seat for reducing or eliminating the inaccuracy in determining the adjusted preset characteristic.

2. The method, as claimed in claim 1, wherein the preset characteristic is a setting position of the vehicle seat in the longitudinal direction of the vehicle.

3. The method, as claimed in claim 2, wherein the adjusted preset characteristic is determined on the basis of a relative measurement of a position of the vehicle seat from the starting position to another position.

4. The method, as claimed in claim 1, wherein the preset characteristic is determined on the basis of a relative measurement of a position of the vehicle seat from the starting position to another position.

5. The method, as claimed in claim 1, wherein a request for calibration is sent as a function of a gauge for the inaccuracy in determining the adjusted preset characteristic.

6. The method, as claimed in claim 1, wherein a measure for preventing a vehicle occupant from being able to carry out the calibration as a function of a gauge for the inaccuracy in determining the adjusted preset characteristic is deactivated.

7. The method, as claimed in claim 1, wherein the safety device is controlled as a function of a gauge for an inaccuracy in determining the adjusted preset characteristic.

8. The method, as claimed in claim 1, further comprising the acts of:

determining, from a plurality of adjustment events of the electric adjusting mechanism, a tolerance range for the at least one preset characteristic in which a calibration triggering point is expected;

determining whether the calibration triggering point is detected;

when the calibration triggering point is detected, determining whether the adjusted preset characteristic is in the tolerance range; and when the adjusted preset characteristic is in the tolerance range, outputting a calibration request to a vehicle occupant.

9. A safety system in a motor vehicle, comprising:

an electric adjusting mechanism configured to adjust a preset characteristic of a vehicle seat, detect measured adjustments of the preset characteristic of the vehicle seat, and determine an adjusted preset characteristic of the vehicle seat based on a difference between a starting position and the measured adjustments of the preset characteristic of the vehicle seat;

a safety device configured to protect an occupant of the vehicle;

a control unit configured to control the safety device based on the adjusted preset characteristic of the vehicle seat; and a pulse generator connected to a drive motor or the gear of a drive motor of the adjusting mechanism and configured to detect measured adjustment values, wherein an inaccuracy in determining the adjusted preset characteristic is reduced or eliminated by a calibration, wherein the calibration is carried out as a function of a number of a plurality of adjustments of the preset characteristic of the seat for reducing or eliminating the inaccuracy in determining the adjusted preset characteristic.

* * * * *